US010561280B1

(12) United States Patent
Creel

(10) Patent No.: US 10,561,280 B1
(45) Date of Patent: Feb. 18, 2020

(54) POT LID STAND

(71) Applicant: Julia Creel, Grand Ridge, FL (US)

(72) Inventor: Julia Creel, Grand Ridge, FL (US)

( * ) Notice: Subject to any disclaimer, the term of this patent is extended or adjusted under 35 U.S.C. 154(b) by 0 days.

(21) Appl. No.: 16/434,337

(22) Filed: Jun. 7, 2019

Related U.S. Application Data

(60) Provisional application No. 62/768,155, filed on Nov. 16, 2018.

(51) Int. Cl.
*A47J 47/16* (2006.01)
*A47F 5/01* (2006.01)

(52) U.S. Cl.
CPC ............... *A47J 47/16* (2013.01); *A47F 5/01* (2013.01)

(58) Field of Classification Search
CPC .. A47J 47/16; A47J 36/06; A47J 36/12; A47J 36/34; A47J 37/0786; A47J 43/18; A47J 47/20; A47J 47/00; A47B 81/04; A47B 23/043; A47B 23/042; A47B 2023/045; A47B 55/02; A47B 73/002; A47B 77/14; A47F 5/01; A47F 7/0064; A47F 5/13; A47F 7/0042; A47F 7/0007; A47F 7/0057; A47F 7/0014; A47F 7/0021; A47F 7/0028; A47F 7/06; A47F 7/14; A47F 7/142; A47F 7/146; A47F 7/148; A47F 7/286; A47F 7/0035; A47F 3/147; A47F 5/0056; A47L 19/04; A47L 15/505; A47L 15/50; A47G 25/10
USPC ...... 211/41.11, 41.2, 37.3, 41.4, 181.1, 70.7, 211/184, 106, 112; 248/302, 37.3, 465.1, 248/175, 453, 309.1, 311.2, 441.1
See application file for complete search history.

(56) References Cited

U.S. PATENT DOCUMENTS

| 428,555 | A | * | 5/1890 | Dom | ..................... B42F 17/08 211/11 |
| 1,309,608 | A | * | 7/1919 | Bonner | ................... A47J 47/16 211/41.11 |
| 1,675,621 | A | * | 7/1928 | Spencer | .............. A47B 23/042 248/448 |
| 1,809,018 | A | * | 6/1931 | Bruning | ................ A47B 55/02 248/214 |
| D162,925 | S | * | 4/1951 | Berkowitz | ................. D6/678.4 |

(Continued)

FOREIGN PATENT DOCUMENTS

JP        06284983 A  * 10/1994

OTHER PUBLICATIONS

Jul. 29, 2019 Magazine—Collections & ETC Published in Elk Grove Village, Illinois Date of Magazine—Fall.

*Primary Examiner* — Hiwot E Tefera
(74) *Attorney, Agent, or Firm* — Global Intellectual Property Agency, LLC; Daniel Boudwin

(57) ABSTRACT

A pot lid stand. The device includes a pair of longitudinal members defining a channel therebetween, and a pair of lateral members affixed to opposing end walls of the pair of longitudinal members. An arcuate support wire includes a first end connected to a first end of a first longitudinal member of the pair of longitudinal members, and an opposing second end connected to a second end of the first longitudinal member. A linear support wire includes a lower end connected to the first longitudinal member and an upper end connected to the arcuate support wire. The arcuate support wire and the linear support wire are configured to support a lid for a cooking vessel when a perimeter edge of the lid is disposed within the channel, allowing users to support the lid on a countertop or other surface in an upright position.

10 Claims, 3 Drawing Sheets

(56) References Cited

U.S. PATENT DOCUMENTS

| | | | | |
|---|---|---|---|---|
| D162,926 | S | * | 4/1951 | Berkowitz .................. D6/675.5 |
| 2,934,210 | A | * | 4/1960 | Jordan ..................... A47J 47/20 |
| | | | | 211/41.11 |
| 2,964,200 | A | * | 12/1960 | King ....................... A47B 55/02 |
| | | | | 108/135 |
| 3,225,939 | A | * | 12/1965 | Braun ....................... A47F 5/01 |
| | | | | 211/186 |
| 4,231,175 | A | * | 11/1980 | Baxter .................... B42F 17/06 |
| | | | | 211/181.1 |
| 4,850,556 | A | * | 7/1989 | Otani ...................... A47J 47/16 |
| | | | | 248/206.2 |
| 4,893,771 | A | | 1/1990 | Kaneshiro |
| 5,246,195 | A | | 9/1993 | Huff |
| 5,979,673 | A | * | 11/1999 | Dooley ................... A47J 47/16 |
| | | | | 211/41.11 |
| 6,299,003 | B1 | * | 10/2001 | Osorio ................... A47L 15/505 |
| | | | | 211/181.1 |
| D468,163 | S | * | 1/2003 | Blake ............................ D7/601 |
| 7,025,312 | B1 | | 4/2006 | Dare |
| D736,566 | S | * | 8/2015 | Tsai ............................... D7/601 |
| 2004/0173725 | A1 | * | 9/2004 | Rodriguez Villanueva ................ |
| | | | | A47B 23/042 |
| | | | | 248/454 |
| 2006/0186124 | A1 | | 8/2006 | Sergianni |
| 2008/0251472 | A1 | * | 10/2008 | Kasden ................... A47J 36/06 |
| | | | | 211/41.2 |
| 2009/0314729 | A1 | * | 12/2009 | McCarthy ............. A47F 7/0042 |
| | | | | 211/87.01 |
| 2015/0014495 | A1 | | 1/2015 | Bausman |
| 2017/0119216 | A1 | * | 5/2017 | Szczepaniak ........... A47J 43/18 |
| 2018/0344092 | A1 | * | 12/2018 | Meyer ..................... A47J 43/18 |

* cited by examiner

POT LID STAND

CROSS REFERENCE TO RELATED APPLICATIONS

This application claims the benefit of U.S. Provisional Application No. 62/768,155 filed on Nov. 16, 2018. The above identified patent application is herein incorporated by reference in its entirety to provide continuity of disclosure

BACKGROUND OF THE INVENTION

The present invention relates to holders for cooking vessel lids. More specifically, the present invention provides a pot lid stand that includes a pair of longitudinal members defining a channel configured to receive perimeter edge of a lid therein, as well as wire supports for supporting the lid in an upright position.

When cooking with a pot or other similar cooking vessels, it is often desirable to cover the cooking vessel with a lid. Once covered with a lid, the cooking vessel will eventually need to be uncovered in order to access its contents, and so the lid must be removed. It can be difficult to find space on a countertop when removing a lid from a cooking vessel. The typical solution of laying the lid flat down on the countertop takes up valuable space and causes clutter. The lid can often reach temperatures close to that of the cooking vessel, so it can be difficult to handle and store such a hot lid. One option is to try to balance the lid on the upper rim of the cooking vessel in such a way that an opening is left for a user to access the contents of the cooking vessel. However, the lid often falls off of the cooking vessel when balanced in such a precarious manner, which could cause a mess or potentially injure the user. In view of these concerns, the present invention provides a pot lid stand that can be utilized to support a pot lid or other cooking vessel lid in an upright position on a countertop or other support surface.

Devices have been disclosed the known art that relate to holders and supports for cooking vessel lids. These include devices that have been disclosed in issued patents and in published patent applications. However, these devices have several drawbacks. For example, some of these devices support the pot lid in a flat orientation, which causes the pot lid to take up more space than necessary. Further, these devices fail to provide a pot lid holder that includes a pair of spaced supports defining a channel for receiving the lid, an arcuate support wire, and a vertical support wire for effectively supporting a pot lid in an upright position.

In light of the devices disclosed in the known art, it is submitted that the present invention substantially diverges in design elements from the known art and consequently it is clear that there is a need in the art for an improvement to existing pot lid holder devices. In this regard the present invention substantially fulfills these needs.

SUMMARY OF THE INVENTION

In view of the foregoing disadvantages inherent in the known types of pot lid holders now present in the prior art, the present invention provides a pot lid stand wherein the same can be utilized for providing convenience for the user when supporting a lid for a cooking vessel on a countertop or other support surface. In an exemplary embodiment, the pot lid stand includes a pair of longitudinal members defining a channel therebetween, as well as a pair of lateral members affixed to opposing end walls of the pair of longitudinal members, defining a base portion for the stand. An arcuate support wire includes a first end connected to a first end of a first longitudinal member of the pair of longitudinal members, and an opposing second end connected to a second end of the first longitudinal member. A linear support wire includes a lower end connected to the first longitudinal member and an upper end connected to the arcuate support wire. The arcuate support wire and the linear support wire are configured to support a lid of a cooking vessel in an upright position when a perimeter edge of the lid is disposed within the channel.

One object of the present invention is to provide a pot lid stand that includes all of the advantages of pot lid holder devices in the known art and none of the disadvantages.

Another object of the present invention is to provide a pot lid stand that provides users with the ability to support a pot lid on a countertop or other support surface for easy accessibility when cooking or cleaning dishes.

A further object of the present invention is to provide a pot lid stand that is made from materials that permit relative economy and are commensurate with durability.

Still a further object of the present invention is to provide a pot lid stand composed of materials that are able to withstand high temperatures.

Yet another object of the present invention is to provide a pot id stand that is lightweight and easy to set up for use or put away for storage.

Other objects, features, and advantages of the present invention will become apparent from the following detailed description, taken in conjunction with accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
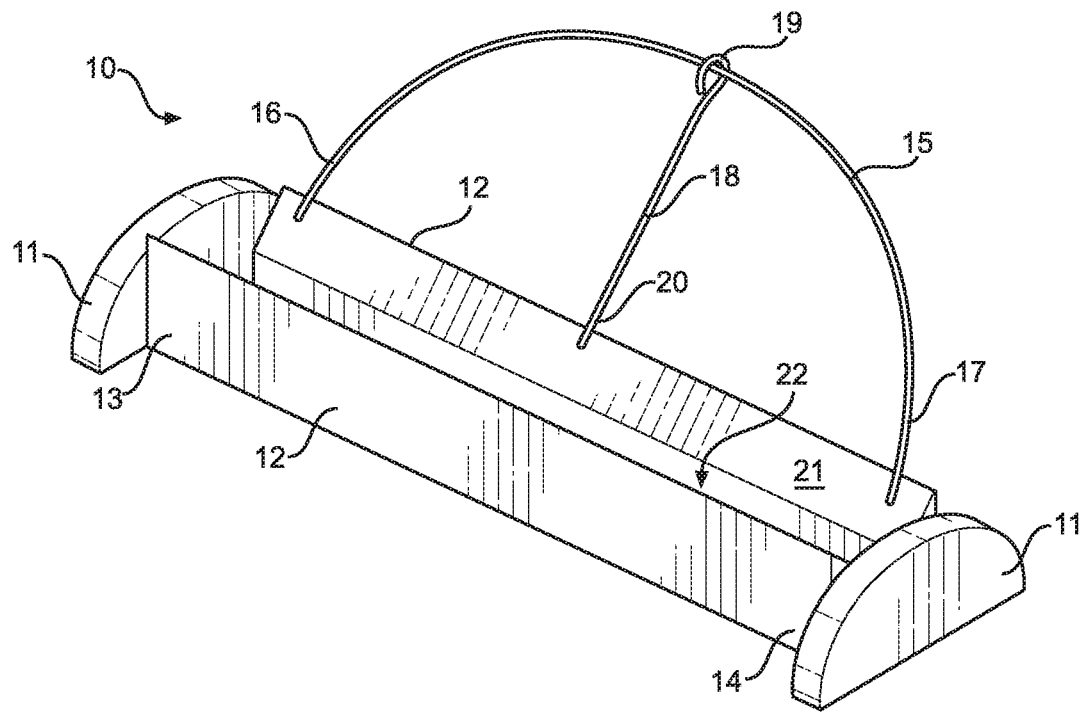
FIG. 1 shows a front perspective view of an embodiment of the pot lid stand.

Reference is made herein to the attached drawings. Like reference numerals are used throughout the drawings to depict like or similar elements of the pot lid stand. For the purposes of presenting a brief and clear description of the present invention, the preferred embodiment will be discussed as used for supporting a pot lid or other cooking vessel lid on a countertop or other support surface. The figures are intended for representative purposes only and should not be considered to be limiting in any respect.

Figure 2:
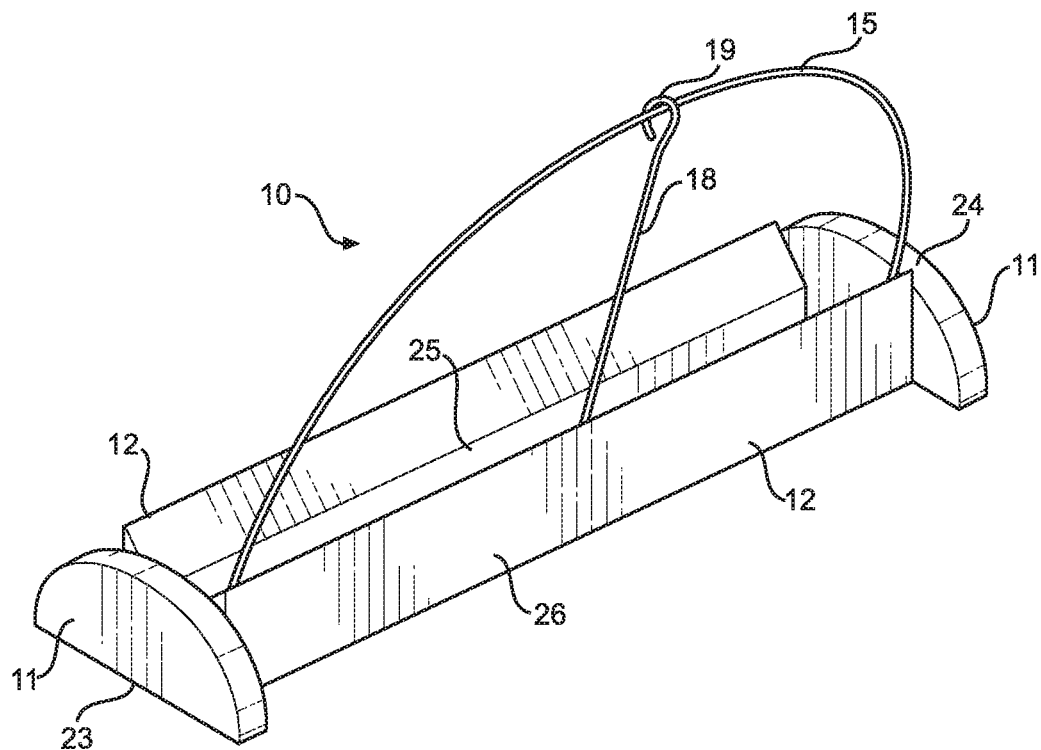
FIG. 2 shows a rear perspective view of an embodiment of the pot lid stand.

Referring now to FIGS. 1 and 2, there is shown a front perspective view of an embodiment of the pot lid stand and a rear perspective view of an embodiment of the pot lid stand, respectively. The pot lid stand 10 is configured to support a pot lid or other cooking vessel lid in an upright position. To accomplish this, the pot lid stand 10 includes a pair of longitudinal members 12 and a pair of lateral members 11 that form a base of the pot lid stand 10. The lateral members 1 are affixed to opposing ends 13, 14 of the longitudinal members. The pair of longitudinal members 12 are oriented parallel to each other and define a channel 22 therebetween. The channel 22 is configured to receive a perimeter edge of a pot lid therein.

The pot lid stand 20 further includes an arcuate support wire 15 comprising a first end 16 connected to a first end 13 of one of the longitudinal members 12, and an opposing second end 17 connected to a second end 14 of the same longitudinal member 12. A linear support wire 18 includes a lower end 20 connected to the same longitudinal member 12 and an upper end 19 connected to the arcuate support wire 15, The linear and arcuate wires 18, 15 are configured to support a pot lid in an upright position when the pot lid is situated within the channel 22.

In the shown embodiment, the linear wire 18 is secured to the arcuate wire 15 via a loop disposed on the upper end 19 of the linear wire 18 that encircles the outer circumference of the arcuate wire 15. This allows some flexibility and movement to occur under the weight of a pot lid, as the arcuate wire 15 can slide slightly within the loop on the linear wire 18. In other embodiments, the arcuate wire 15 and the linear wire 18 may be integral in construction, welded together, or maintain any other suitable connection mechanism.

In the illustrated embodiment, the lateral members 11 include a curved upper edge 24 and a planar lower edge 23, forming an outer perimeter having a semicircular shape, which reduces the overall weight of the pot lid stand 10. In the illustrated embodiment, the longitudinal members each include a planar base (visible in FIG. 4), a vertical rear wall 26, a vertical front wall 25, and an angled top wall 21. The angled top wall 21 allows pot lids of various thicknesses to be supported by the pot lid stand 10. The vertical rear wall 26 includes a height that is greater than a height of the vertical front wall 25, such that the angled top walls 21 form a V-shaped opening above the channel 22. Further, the linear and arcuate wires 18, 15 extend upwardly and at an angle from one of the angled top walls 21, allowing a pot lid to lean thereagainst.

Figure 3:
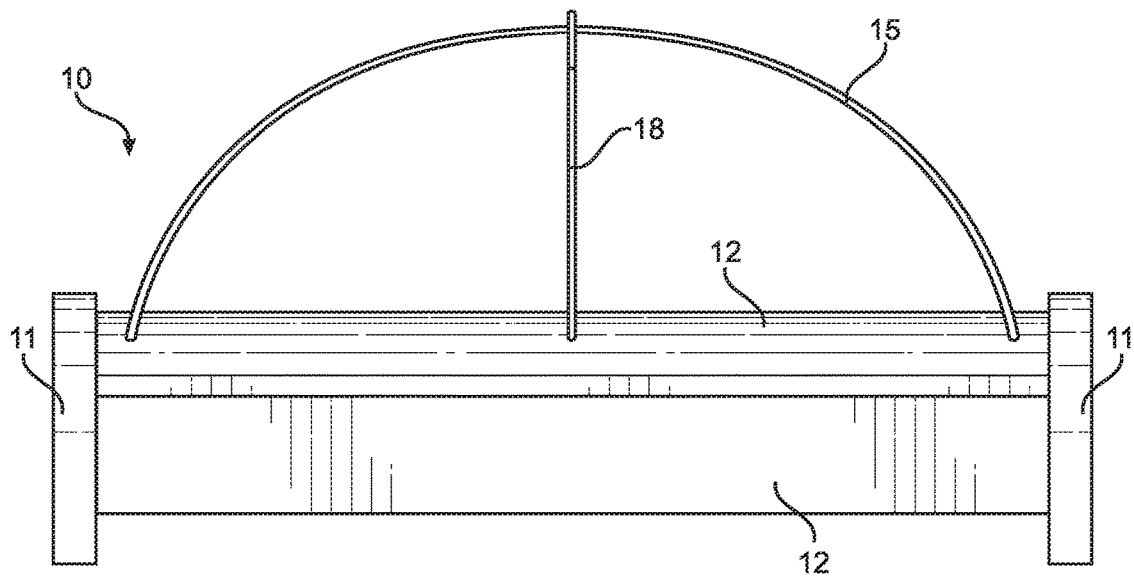
FIG. 3 shows a front elevation view of an embodiment of the pot lid stand.
Figure 4:
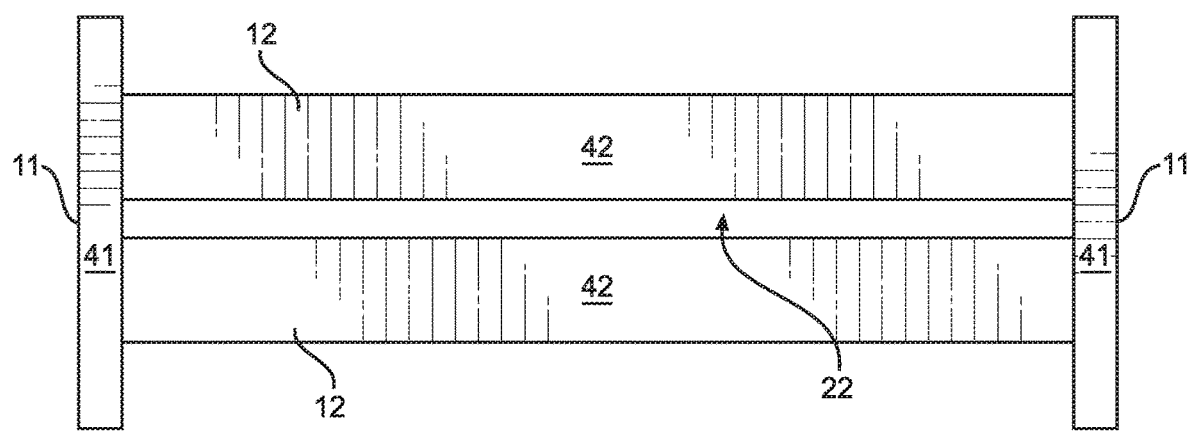
FIG. 4 shows a bottom plan view of an embodiment of the pot lid stand.

Referring now to FIGS. 3 and 4, there is shown a front elevation view of an embodiment of the pot lid stand and a bottom plan view of an embodiment of the pot lid stand, respectively. In the shown embodiment, the linear wire 18 is positioned so as to bisect the arcuate wire 15, providing a support structure that evenly supports the entire surface area of the pod lid stand 10. The lower surface 41 of the lateral members 11 and the lower surface 42 of the longitudinal members 12 are aligned flush with each other so as to provide a flat, stable base for the pot lid stand 10. In the illustrated embodiment, the channel 22 includes an open lower end, such that liquid can drain from the supported lid. In other embodiments, the channel 22 includes a closed lower end, such that any liquid dripping from the supported lid is retained within the pot lid stand 10. Further, in the shown embodiment, the lateral members 11 include a length greater than a width of the longitudinal members 12. The difference in length provides enhanced stability and prevents tipping of the pot lid stand 10 due to the weight of the pot lid that is supported therein.

Figure 5:
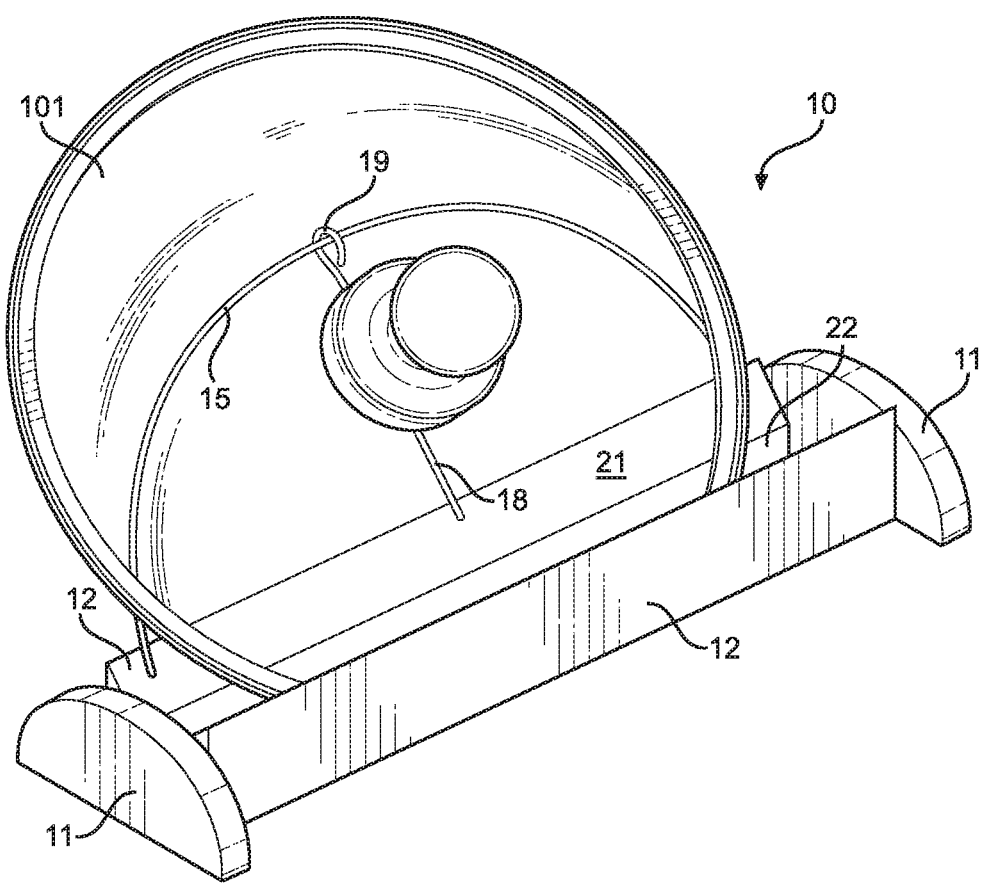
FIG. 5 shows a front perspective view n embodiment of the pot lid stand in use supporting a pot lid.

Referring now to FIG. 5, there is shown a front perspective view of an embodiment of the pot lid stand in use supporting a pot lid. The device is referred to as a pot lid holder 10 but it is intended that the stand may hold lids for other types of cooking vessels, such as woks, sauté pans, or slow cookers, for example. Further, the pot lid holder may be utilized to hold lids from other types of containers if desired. In some embodiments, the arcuate wire 15 and the linear wire 18 are configured to maintain a shape to which they are bent, such that the pot lid 101 can be supported by the pot lid stand 10 a desired angle. In other embodiments, the arcuate wire 15 and the linear wire are configured to be resilient in the way that hey are affixed to the angled top wall 21 of the longitudinal member 12, such that they are biased inwardly toward the channel 22 and help to maintain the pot lid 101 in a vertical position within the channel 22. The loop 19 connection between the linear wire 18 and the arcuate wire 15 provides additional adjustability to support pot lids 101 of different sizes and weights. Further, the lateral members 11 prevent tipping of the pot lid stand 10 when a heavy pot lid 101 is supported therein. In this way, the pot lid stand 10 can be utilized to store a pot lid 101 in an upright position such that it takes up little space and is easily accessible to the user.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pot lid stand, comprising:
   a pair of longitudinal members defining a channel therebetween, each longitudinal member including a planar base, a vertical rear wall, a vertical front wall, and an angled top wall, wherein the vertical rear wall includes a height that is greater than a height of the vertical front wall;
   a pair of lateral members affixed to opposing end walls of the pair of longitudinal members;
   an arcuate support wire comprising a first end connected to a first end of the angled top wall of a first longitudinal member of the pair of longitudinal members, and an opposing second end connected to a second end of the angled top wall of the first longitudinal member;
   a linear support wire comprising a lower end connected to the angled top wall of the first longitudinal member and an upper end connected to the arcuate support wire;
   wherein the arcuate support wire and the linear support wire are configured to support a lid in an upright position when a perimeter edge of the lid is disposed within the channel.

2. The pot lid stand of claim 1, wherein the channel comprises a closed lower end.

3. The pot lid stand of claim 1, wherein the channel comprises an open lower end.

4. The pot lid stand of claim 1, wherein a pair of lower surfaces of the pair of longitudinal members are aligned flush with a pair of lower surfaces of the pair of lateral members.

5. The pot lid stand of claim 1, wherein the pair of lateral members comprise semicircular outer perimeters.

6. The pot lid stand of claim 1, wherein the linear support wire comprises a loop disposed on the upper end thereof, wherein the loop is wrapped around the arcuate support wire.

7. The pot lid stand of claim 1, wherein the linear support wire and the arcuate support wire are composed of a resilient material.

8. The pot lid stand of claim 1, wherein the linear support wire and the arcuate support wire are both configured to maintain a shape to which they are bent.

9. The pot lid stand of claim 1, wherein the linear support wire is positioned so as to bisect the arcuate support wire.

10. The pot lid stand of claim 1, wherein each lateral member includes a length that is greater than a width of each longitudinal member.

\* \* \* \* \*